United States Patent
Bhardwaj et al.

(10) Patent No.: US 10,255,686 B2
(45) Date of Patent: *Apr. 9, 2019

(54) ESTIMATING DEPTH FROM A SINGLE IMAGE

(71) Applicant: eBay Inc., San Jose, CA (US)

(72) Inventors: Anurag Bhardwaj, Sunnyvale, CA (US); Mohammad Haris Baig, Cross River, NY (US); Robinson Piramuthu, Oakland, CA (US); Vignesh Jagadeesh, Santa Clara, CA (US); Wei Di, San Jose, CA (US)

(73) Assignee: eBay Inc., San Jose, CA (US)

( * ) Notice: Subject to any disclaimer, the term of this patent is extended or adjusted under 35 U.S.C. 154(b) by 164 days.

This patent is subject to a terminal disclaimer.

(21) Appl. No.: 15/408,648

(22) Filed: Jan. 18, 2017

(65) Prior Publication Data

US 2017/0193672 A1    Jul. 6, 2017

Related U.S. Application Data

(63) Continuation of application No. 14/994,459, filed on Jan. 13, 2016, now Pat. No. 9,594,774, which is a
(Continued)

(51) Int. Cl.
*G06T 7/50* (2017.01)
*G06F 17/30* (2006.01)
(Continued)

(52) U.S. Cl.
CPC ............ *G06T 7/50* (2017.01); *G06F 17/3025* (2013.01); *G06F 17/30256* (2013.01);
(Continued)

(58) Field of Classification Search
CPC ........... G06F 17/3025; G06F 17/30256; G06F 17/30262; G06F 17/30277;
(Continued)

(56) References Cited

U.S. PATENT DOCUMENTS 9,275,078 B2    3/2016  Bhardwaj et al.
9,594,774 B2 *  3/2017  Bhardwaj ......... G06F 17/30277
(Continued)

FOREIGN PATENT DOCUMENTS

AU    2016201655    8/2017
CN    1946195 A     4/2007
(Continued)

OTHER PUBLICATIONS

"U.S. Appl. No. 14/288,233, Examiner Interview Summary dated Sep. 24, 2015", 3 pgs.
(Continued)

*Primary Examiner* — Edward Park
(74) *Attorney, Agent, or Firm* — Schwegman Lundberg & Woessner, P.A.

(57) ABSTRACT

During a training phase, a machine accesses reference images with corresponding depth information. The machine calculates visual descriptors and corresponding depth descriptors from this information. The machine then generates a mapping that correlates these visual descriptors with their corresponding depth descriptors. After the training phase, the machine may perform depth estimation based on a single query image devoid of depth information. The machine may calculate one or more visual descriptors from the single query image and obtain a corresponding depth descriptor for each visual descriptor from the generated mapping. Based on obtained depth descriptors, the machine creates depth information that corresponds to the submitted single query image.

20 Claims, 7 Drawing Sheets

Related U.S. Application Data continuation of application No. 14/288,233, filed on May 27, 2014, now Pat. No. 9,275,078.

(60) Provisional application No. 61/874,096, filed on Sep. 5, 2013.

(51) Int. Cl.
  *G06K 9/00* (2006.01)
  *G06T 7/194* (2017.01)
  *G06T 7/62* (2017.01)
  *G06K 9/46* (2006.01)

(52) U.S. Cl.
  CPC .. *G06F 17/30262* (2013.01); *G06F 17/30277* (2013.01); *G06K 9/00208* (2013.01); *G06K 9/4609* (2013.01); *G06T 7/194* (2017.01); *G06T 7/62* (2017.01); *G06T 2207/10024* (2013.01); *G06T 2207/10028* (2013.01); *G06T 2207/20081* (2013.01)

(58) Field of Classification Search
  CPC .. G06K 9/00208; G06K 9/4609; G06T 7/194; G06T 7/50; G06T 7/62; G06T 2207/10024; G06T 2207/10028; G06T 2207/20081
  See application file for complete search history.

(56) References Cited

U.S. PATENT DOCUMENTS

| | | | | |
|---|---|---|---|---|
| 2011/0052043 | A1* | 3/2011 | Hyung | G06T 7/277 382/154 |
| 2013/0101158 | A1* | 4/2013 | Lloyd | G06T 7/62 382/103 |
| 2013/0106837 | A1* | 5/2013 | Mukherjee | G06T 15/40 345/419 |
| 2015/0063681 | A1 | 3/2015 | Bhardwaj et al. | |
| 2016/0124995 | A1 | 5/2016 | Bhardwaj et al. | |

FOREIGN PATENT DOCUMENTS

| | | |
|---|---|---|
| CN | 105359190 A | 2/2016 |
| CN | 105359190 B | 9/2018 |
| JP | 2000041173 A | 2/2000 |
| JP | 2012-079313 A | 4/2012 |
| KR | 10-2003-0043637 A | 6/2003 |
| KR | 10-2008-0089148 A | 10/2008 |
| KR | 10-2012-0001847 A | 1/2012 |
| KR | 10-2012-0075739 A | 7/2012 |
| WO | WO-2012091814 A2 | 7/2012 |
| WO | WO-2015035089 A1 | 3/2015 |

OTHER PUBLICATIONS

"U.S. Appl. No. 14/288,233, Non Final Office Action dated Aug. 4, 2015", 21 pgs.
"U.S. Appl. No. 14/288,233, Notice of Allowance dated Oct. 30, 2015", 8 pgs.
"U.S. Appl. No. 14/288,233, Response filed Oct. 23, 2015 to Non Final Office Action dated Aug. 4, 2015", 15 pgs.
"U.S. Appl. No. 14/994,459, Amendment Under 37 C.F.R. filed Dec. 21, 2016", 10 pgs.
"U.S. Appl. No. 14/994,459, Examiner Interview Summary dated Aug. 19, 2016", 3 pgs.
"U.S. Appl. No. 14/994,459, Non Final Office Action dated Jul. 8, 2016", 22 pgs.
"U.S. Appl. No. 14/994,459, Notice of Allowability dated Feb. 1, 2017", 2 pgs.
"U.S. Appl. No. 14/994,459, Notice of Allowance dated Oct. 28, 2016", 9 pgs.
"U.S. Appl. No. 14/994,459, PTO Response to Rule 312 Communication dated Jan. 5, 2017", 2 pgs.
"U.S. Appl. No. 14/994,459, Response filed Oct. 7, 2016 to Non Final Office Action dated Jul. 8, 2016", 12 pgs.
"Australian Application Serial No. 2016201655, First Examiner Report dated Nov. 17, 2016", 2 pgs.
"Australian Application Serial No. 2016201655, Response to First Examiner Report dated Mar. 21, 2017", 19 pgs.
"Canadian Application Serial No. 2,911,522, Office Action dated Nov. 13, 2015", 4 pgs.
"Canadian Application Serial No. 2,911,522, Response filed May 13, 2016 to Office Action dated Nov. 13, 2015", 3 pgs.
"European Application Serial No. 14841884.1, Extended European Search Report dated Dec. 7, 2016", 10 pgs.
"European Application Serial No. 14841884.1, Response filed Feb. 23, 2017 to Extended European Search Report dated Dec. 7, 2016", 38 pgs.
"European Application Serial No. 14841884.1, Response filed Jul. 26, 2016 to Communication pursuant to Rules 161(1) and 162 EPC dated Apr. 12, 2016", 14 pgs.
"International Application Serial No. PCT/US2014/054148, International Preliminary Report on Patentability dated Jul. 28, 2015", 23 pgs.
"International Application Serial No. PCT/US2014/054148, International Search Report dated Nov. 25, 2014", 2 pgs.
"International Application Serial No. PCT/US2014/054148, Response filed Jul. 2, 2015 to Written Opinion dated Nov. 25, 2014", 19 pgs.
"International Application Serial No. PCT/US2014/054148, Written Opinion dated Nov. 25, 2014", 7 pgs.
"Korean Application Serial No. 10-2016-7026770, Office Action dated Oct. 18, 2016", W/ English Translation, 5 pgs.
"Korean Application Serial No. 10-2016-7026770, Response filed Jan. 4, 2017 to Office Action dated Oct. 18, 2016", w/ English Claims, 13 pgs.
"Korean Application Serial No. 2015-7033171, Office Action dated Jan. 18, 2016", w/ English Translation, 6 pgs.
"Korean Application Serial No. 2015-7033171, Response filed Apr. 11, 2016 to Office Action dated Jan. 18, 2016", (English Translation of Claims), 12 pgs.
Bulthoff, Isabelle, et al., "Top-down influences on stereoscopic depth-perception", Nature Neuroscience, 1(3), (1998), 254-257.
Furukawa, Y., et al., "Accurate, Dense, and Robust Multiview Stereopsis", IEEE Transactions on Pattern Analysis and Machine Intelligence, 32(8), (Aug. 2010), 1362-1376.
Furukawa, Y., et al., "Towards Internet-scale multi-view stereo", 2010 IEEE Conference on Computer Vision and Pattern Recognition (CVPR),, (2010), 1434-1441.
Gupta, S., et al., "Perceptual Organization and Recognition of Indoor Scenes from RGB-D Images", 2013 IEEE Conference on Computer Vision and Pattern Recognition (CVPR), (2013), 564-571.
Hoiem, Derek, et al., "Automatic photo pop-up", ACM Transactions on Graphics (TOG)—Proceedings of ACM SIGGRAPH 2005, 24(3), (Jul. 2005), 577-584.
Hoiem, Derek, et al., "Recovering Surface Layout from an Image", International Journal of Computer Vision, 75(1), (Oct. 2007), 151-172.
Karsch, Kevin, et al., "Depth Extraction from Video Using Non-parametric Sampling", Computer Vision—ECCV 2012, Lecture Notes in Computer Science, vol. 7576, (2012), 775-788.
Konrad, J., et al., "Learning-Based, Automatic 2D-to-3D Image and Video Conversion", IEEE Transactions on Image Processing, 22(9), (Sep. 2013), 3485-3496.
Loomis, J. M, "Looking down is looking up", Nature, 414(6860), (Nov. 8, 2001), 155-6.
Saxena, A., et al., "Make3D: Learning 3D Scene Structure from a Single Still Image", IEEE Transactions on Pattern Analysis and Machine Intelligence, 31(5), (May 2009), 824-840.
Silberman, N., et al., "Indoor scene segmentation using a structured light sensor", 2011 IEEE International Conference on Computer Vision Workshops (ICCV Workshops), (2011), 601-608.

(56) References Cited

OTHER PUBLICATIONS

Silberman, N., et al., "Indoor Segmentation and Support Inference from RGBD Images", Computer Vision—ECCV 2012, Lecture Notes in Computer Science, vol. 7576, (2012), 746-760.
Silberman, Nathan, et al., "Indoor Segmentation and Support Inference from RGBD Images", ECCV-12 submission ID 1079, [Online]. Retrieved from the Internet: <URL: http://cs.nyu.edu/~silberman/papers/indoor_seg_support.pdf>, (2012), 1-14.
Silberman, Nathan, et al., "NYU Depth Dataset V2", ECCV 2012, [Online]. Retrieved from the Internet: <URL: http://cs.nyu.edu/~silberman/datasets/nyu_depth_v2.html>, (2012), 3 pgs.
Xiaofeng, Ren, et al., "RGB-(D) scene labeling: Features and algorithms", Computer Vision and Pattern Recognition (CVPR), 2012 IEEE Conference on, IEEE,, (Jun. 16, 2012), 8 pgs.
Office Action received for Chinese Patent Application No. 201480038069.1, dated Feb. 23, 2018, 7 pages (3 pages of English Translation and 4 pages of Official Copy).
Response to Office Action filed on Oct. 17, 2017 for Chinese Patent Application No. 201480038069.1 dated Jun. 2, 2017, 16 pages (13 pages of Official Copy and 3 pages of English Pending Claims).
Notice of Allowance received for Korean Patent Application No. 10-2015-7033171, dated Jun. 28, 2016, 3 pages (1 page of English Translation and 2 pages of Official Copy).
Notice of Allowance received for Korean Patent Application No. 10-2016-7009451, dated Apr. 28, 2016, 3 pages (1 pages of English Translation and 2 pages of Official Copy).
Response to Office Action filed on May 10, 2018 for Chinese Patent Application No. 201480038069.1, dated Feb. 23, 2018, 44 pages (2 pages of English Translation, 35 pages of Official Copy and 7 pages of Pending Claims).
"Chinese Application Serial No. 201480038069.1, Office Action dated Jun. 2, 2017", 19 pgs.

\* cited by examiner

ESTIMATING DEPTH FROM A SINGLE IMAGE

RELATED APPLICATION

This application is a continuation of U.S. patent application Ser. No. 14/994,459, filed Jan. 13, 2016, which is a continuation of U.S. patent application Ser. No. 14/288,233, filed May 27, 2014, which claims the priority benefit of U.S. Provisional Patent Application No. 61/874,096, filed Sep. 5, 2013, each of which is incorporated herein by reference in their entirety.

TECHNICAL FIELD

The subject matter disclosed herein generally relates to the processing of data. Specifically, the present disclosure addresses systems and methods to facilitate image processing and usage of image data obtained from image processing.

BACKGROUND

Images can be used to convey information more efficiently or in a way not possible with text, particularly from the viewpoint of a user viewing the images or to facilitate electronic commerce ("e-commerce"). However, in order to use images based on the wealth of information contained therein, image processing is performed to extract, identify, or otherwise recognize attributes of the images. Once extracted, the image data can be used in a variety of applications. Depending on the particular application, certain types of image processing may be implemented over others.

BRIEF DESCRIPTION OF THE DRAWINGS

Some embodiments are illustrated by way of example and not limitation in the figures of the accompanying drawings.

DETAILED DESCRIPTION

Example methods and systems are directed to estimating depth from a single image. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

A machine may be configured (e.g., by hardware, software, or both) to perform image processing tasks that include estimating depth information from a single image. Such a machine may form all or part of a system for performing such image processing tasks.

During a training phase, the machine accesses a reference database (e.g., a training database) that stores a reference set of images with corresponding depth information. Based on this accessed information, the machine calculates descriptors of features represented in the images (e.g., from color pixel data) and in the depth information. Such descriptors may be considered as highly compressed versions of image portions or depth map portions that contain these features. Specifically, the machine calculates visual descriptors (e.g., from color pixels in the reference images) and their corresponding depth descriptors (e.g., from the corresponding depth information). The machine then generates a data structure (e.g., a matrix stored in a memory or other machine-readable medium) that correlates these visual descriptors with their corresponding depth descriptors. The generating of this data structure may be referred to as building a cross-domain map for translating between a dictionary of visual descriptors to a corresponding dictionary of depth descriptors, or vice versa.

After the training phase, the machine may be operated in a post-training phase (e.g., a usage phase or a run-time phase) in which the machine is configured to perform depth estimation based on a single image (e.g., a query image) that is devoid of depth information. Specifically, the machine may analyze the single image (e.g., submitted within a query for depth information or within a request to estimate depth information) and calculate one or more visual descriptors (e.g., from color pixels in the submitted single image). The machine may then obtain a corresponding depth descriptor for each visual descriptor by accessing the previously generated data structure (e.g., matrix). Based on one or more depth descriptors obtained from the data structure, the machine may create (e.g., by calculation, estimation, or both) depth information that corresponds to the submitted single image.

The machine may provide this depth information (e.g., as a depth map or depth image) response to a query or request. Thereafter, the machine may provide this depth information to any machine or software application (e.g., a shipping application, a visualization application, or any suitable combination thereof).

During the training phase, the reference database may store color images (e.g., tristimulus images) that are two-dimensional images containing pixels, and these pixels may be defined within a color space by three color values per pixel (e.g., three tristimulus values, such as a red value, a green value, and a blue value in a red-green-blue (RGB) image). In some example embodiments, one or more of the color images has pixels defined by four color values per pixel (e.g., a cyan value, a magenta value, yellow value, and a black value in a cyan-magenta-yellow-black (CMYK) image). In other example embodiments, the fourth color value for each pixel is a transparency value (e.g., an alpha value in a red-green-blue-alpha (RGBA) image). In any event, the color images may be stored in the reference database with corresponding depth maps (e.g., depth images) that are two-dimensional images or other arrays. Each of these depth maps may contain a depth (D) value for each pixel in the corresponding color image. According to various example embodiments, color information includes brightness information (e.g., luma (Y) values), the brightness information may be collectively defined by multiple color values (e.g., a red value, a green value, and a blue value in a red-green-blue (RGB) pixel) and need not be defined by a single color value (e.g., a luma value in a YIN pixel).

Alternatively, since depth values may be treated as depth pixels, the reference database may store reference images that combine both color and depth information. For example, the reference database may store red-green-blue-depth (RGB-D) images, with each RGB-D image including channels (e.g., separate arrays) for red, green, blue, and depth values. For clarity, the discussion below focuses primarily on color images in the RGB color space (e.g., RGB images). However, the systems and methodologies discussed herein are applicable to color images in other color spaces.

As an illustrative example, given a database of RGB-D images during a training phase, where each of the images includes both red-green-blue (RGB) and depth (D) channels, the machine learns a transformation from a dictionary of RGB descriptors to a dictionary of depth descriptors. Each dictionary may be an entire database of descriptors, or may be subsampled by clustering the descriptors. Every training image may be represented as a sparse linear combination of basis elements in RGB space and in depth space, which may be termed as an RGB projection and a depth projection, respectively. A transformation may then be estimated between the RGB projection and depth projection of all images in the training database.

Continuing the illustrative example, given a query image at test time, only its RGB information may be available. The RGB projection of the query image is estimated, followed by an application of the transformation that estimates, predicts, or otherwise obtains the corresponding depth projection. The depth projection is combined with the depth dictionary to create the corresponding depth map. The resulting depth map may be post-processed with a segmentation of the query image to make sure that depth transitions between objects depicted in a query image are sharp. As a result, when a query RGB image arrives, the learned mapping function is usable to transform its RGB pixel values into depth pixel values.

The depth maps estimated from single image snapshots of objects can be used for measuring dimensions of those objects. This has applications in shipping and products that benefit from real time measurements. The depth maps may be combined with camera parameters obtained from the query image's header information to calculate the three-dimensional (3D) coordinates of points on objects. Measured distances between these points correspond to measurements of physical dimensions of physical objects. Such estimated object dimensions may be provided to a shipping application to facilitate one or more shipping tasks (e.g., selection of a suitable shipping container for an item to be shipped).

The depth maps estimated from single image snapshots can be used for creating visualizations (e.g., 3D fly-throughs) for enhanced browsing of e-commerce inventory in view-item pages. The depth maps may be combined with camera parameters obtained from the query image's header information to generate a 3D point cloud that models the scene depicted in the query image and the objects within the scene. This 3D point cloud may be provided to a rendering engine to create pleasing 3D visualizations of the scene, which may lead to creation or discovery of novel viewpoints (e.g., a modified perspective of the scene from a different angle). Such a rendering may be visualized using virtual reality modeling language (VRML) plugins on a web browser or a mobile browser. This may have the effect of improving the user experience in viewing a single image snapshot of the scene.

Figure 1:
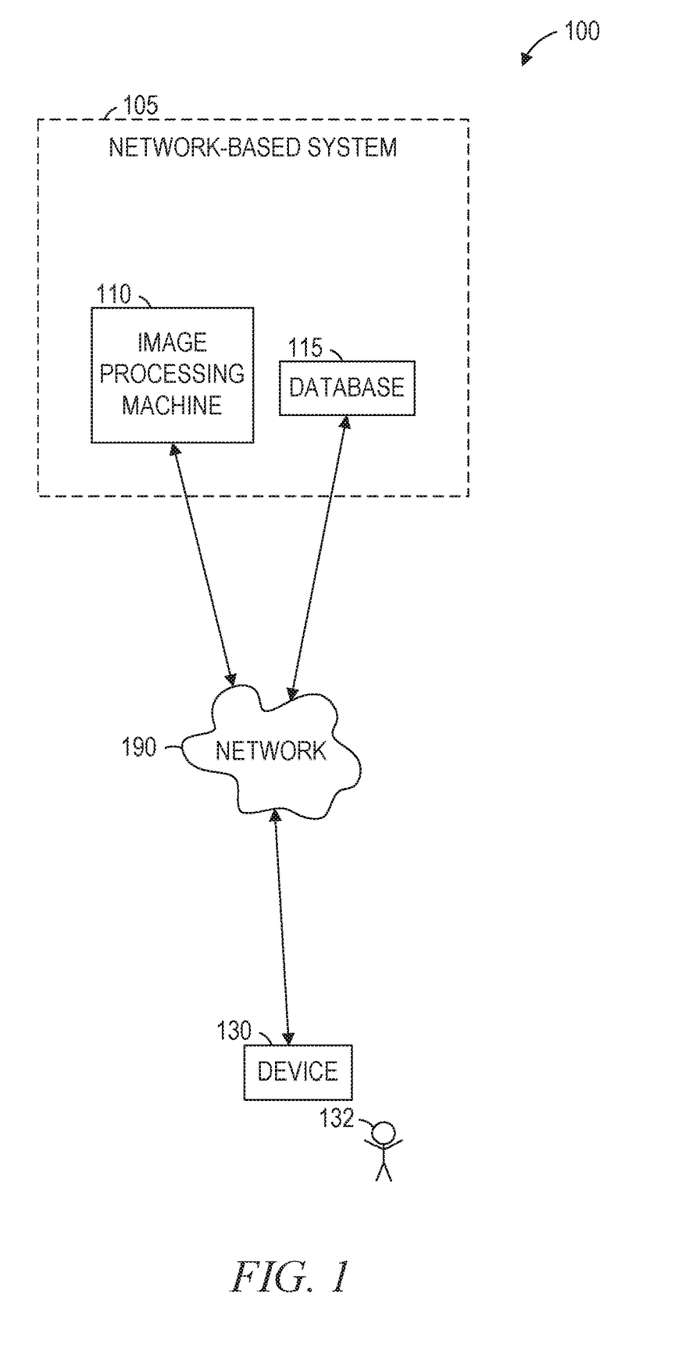
FIG. 1 is a network diagram illustrating a network environment suitable for estimating depth from a single image, according to some example embodiments.

FIG. 1 is a network diagram illustrating a network environment 100 suitable for estimating depth from a single image, according to some example embodiments. The network environment 100 includes an image processing machine 110, a database 115, and a device 130, all communicatively coupled to each other via a network 190. The image processing machine 110 may form all or part of a network-based system 105 (e.g., a cloud-based server system configured to provide one or more image processing services to the device 130). The server machine 110 and the device 130 may each be implemented in a computer system, in whole or in part, as described below with respect to FIG. 7.

Also shown in FIG. 1 is a user 132. The user 132 may be a human user (e.g., a human being), a machine user (e.g., a computer configured by a software program to interact with the device 130), or any suitable combination thereof (e.g., a human assisted by a machine or a machine supervised by a human). The user 132 is not part of the network environment 100, but is associated with the device 130 and may be a user of the device 130. For example, the device 130 may be a desktop computer, a vehicle computer, a tablet computer, a navigational device, a portable media device, a smartphone, or a wearable device (e.g., a smart watch or smart glasses) belonging to the user 132.

Any of the machines, databases, or devices shown in FIG. 1 may be implemented in a general-purpose computer modified (e.g., configured or programmed) by software (e.g., one or more software modules) to be a special-purpose computer to perform one or more of the functions described herein for that machine, database, or device. For example, a computer system able to implement any one or more of the methodologies described herein is discussed below with respect to FIG. 7. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

The network 190 may be any network that enables communication between or among machines, databases, and devices (e.g., the image processing machine 110 and the device 130). Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof. Accordingly, the network 190 may include one or more portions that incorporate a local area network (LAN), a wide area network (WAN), the Internet, a mobile telephone network (e.g., a cellular network), a wired telephone network (e.g., a plain old telephone system (POTS) network), a wireless data network (e.g., WiFi network or WiMAX network), or any suitable combination thereof. Any one or more portions of the network 190 may communicate information via a transmission medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

Figure 2:
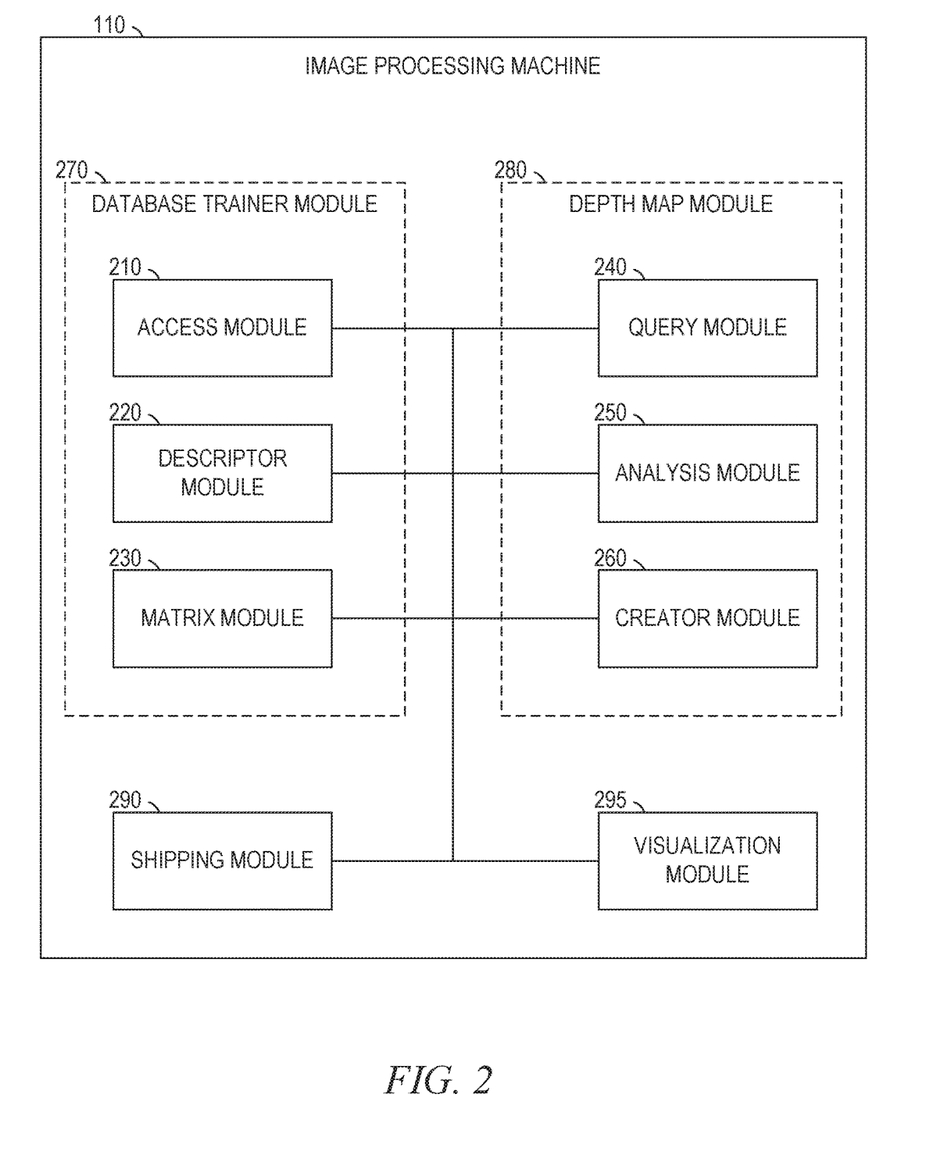
FIG. 2 is a block diagram illustrating components of an image processing machine suitable for estimating depth from a single image, according to some example embodiments.

FIG. 2 is a block diagram illustrating components of the image processing machine 110, according to some example embodiments. The image processing machine 110 is shown as including an access module 210, a descriptor module 220, a matrix module 230, a query module 240, an analysis module 250, a creator module 260, a shipping module 290, and a visualization module 295, all configured to communicate with each other (e.g., via a bus, shared memory, or a switch). Moreover, the access module 210, the descriptor module 220, the matrix module 230, or any suitable combination thereof, may form all or part of a database trainer module 270. Furthermore, the query module 240, the analysis module 250, the creator module 260, or any suitable combination thereof, may form all or part of the depth map module 280. The functions of the foregoing modules is discussed in greater detail below.

Any one or more of the modules described herein may be implemented using hardware (e.g., one or more processors of a machine) or a combination of hardware and software. For example, any module described herein may configure a processor (e.g., among one or more processors of a machine) to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

Before going further, it may be helpful to set forth some preliminary comments on notation for clarity in describing various example embodiments herein. Consider a set off, RGB images and their corresponding depth maps. The set of RGB images made the denoted by $I_{train}=\{R_i \in [0 \ldots 255]^{M \times N}, D_i \in [0 \ldots 10]^{M \times N}\}_{i=1}^L$, and the respective global image descriptors may be denoted by $\{r_i \in \Re^{d_1}, d_i \in \Re^{d_2}\}_{i=1}^L$. A goal in designing a depth transfer algorithm is to estimate a set of correlations (e.g., mappings or assignments) that can generate a depth map for an incoming RGB query image $R_q \rightarrow \hat{D}_q$. The estimated depth map $\hat{D}_q$ may then be compared with known depth information (e.g., ground truth depth) to quantify the quality of the depth transfer algorithm $\|D_q - \hat{D}_q\|$. The strategy used for estimating the mapping between RGB images and depth maps may fall into two broad categories: supervised parametric and supervised non-parametric mappings.

Parametric Transfer:

A mapping is said to be parametric when a transformation between RGB and depth is explicitly parameterized by θ, leading to a mapping of the form $\hat{D}_q \leftarrow f(R_q, \theta | I_{train})$. An example of a parametric depth transfer would be learning a random field prediction model parameterized by θ to transform an input RGB query to a corresponding depth map.

Non-Parametric Transfer:

A mapping is said to be non-parametric when a transformation between RGB and depth is not explicitly parameterized, leading to a mapping of the form $\hat{D}_q \leftarrow f(R_q | I_{train})$. An example of a non-parametric depth transfer would be retrieving visually nearest neighbor RGB images and fusing their corresponding depth maps to come up with a predicted depth estimate.

Figure 3:
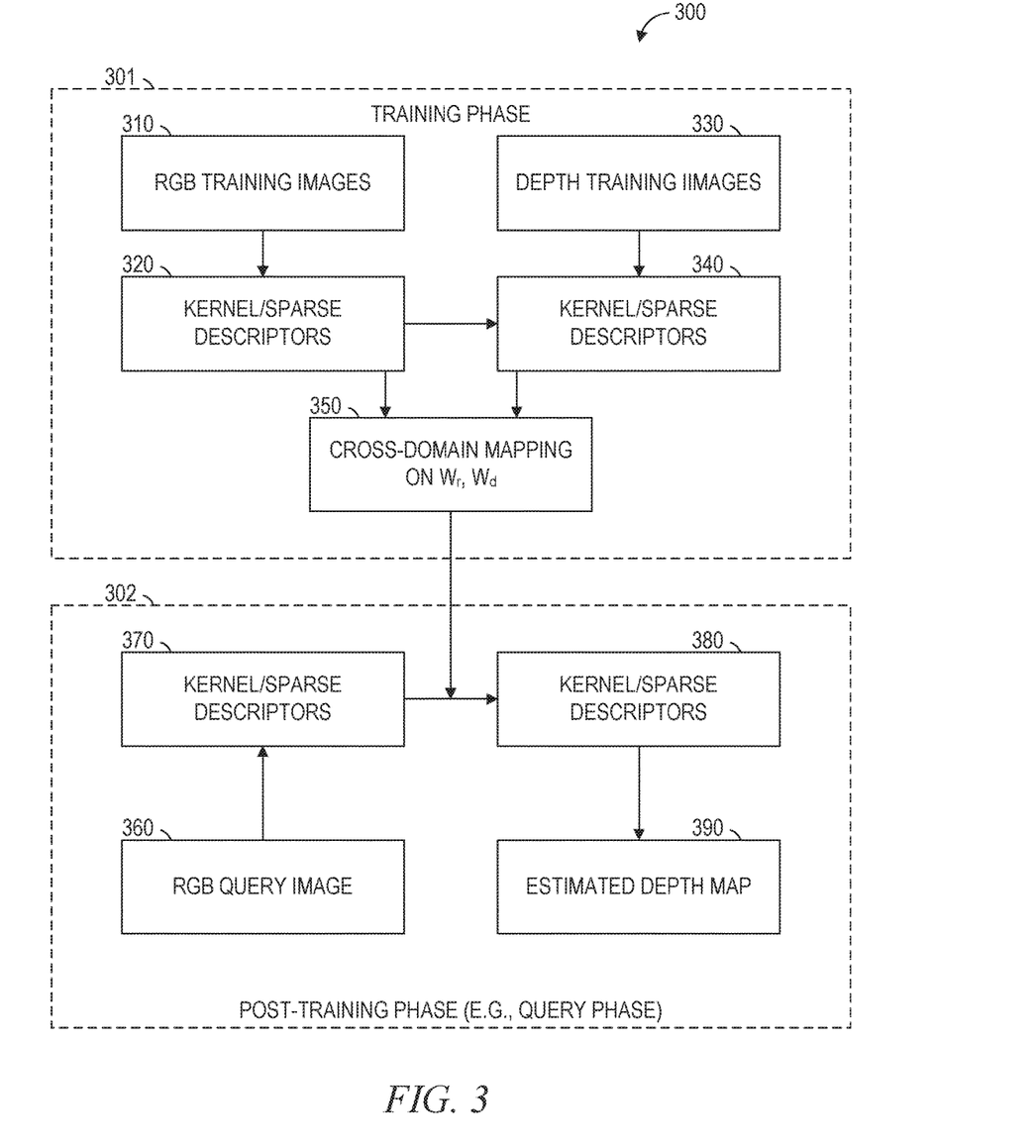
FIG. 3 is a block diagram illustrating a workflow that utilizes the image processing machine to estimate depth from a single image, according to some example embodiments.

FIG. 3 is a block diagram illustrating a workflow 300 that utilizes the image processing machine 110 to estimate depth from a single image, according to some example embodiments. The workflow 300 may include two phases, specifically, a training phase 301 and a post-training phase 302 (e.g., a runtime phase, a test phase, a query phase, or a usage phase). The training phase 301 includes blocks 310, 320, 330, 340, and 350. At block 310, reference images RGB training images) are accessed by the image processing machine 110 (e.g., from the database 115). At block 320, visual descriptors (e.g., kernel/sparse descriptors calculated from color information) are extracted from the reference images by the image processing machine 110. A dictionary (e.g., visual dictionary) may be created from the extracted visual descriptors (e.g., by clustering visual descriptors into visual words or without any clustering) and be denoted as $W_r$. At block 330, reference depth maps (e.g., depth training images) are accessed by the image processing machine 110 (e.g., from the database 115). At block 340, depth descriptors (e.g., kernel/sparse descriptors calculated from depth information) are extracted from the reference depth maps by the image processing machine 110. A dictionary (e.g., a depth dictionary) may be created based on the extracted depth descriptors (e.g., by clustering depth descriptors into depth words or without any clustering) and may be denoted as $W_d$.

At block 350, since correlations between each reference image and its corresponding reference depth map are known and already stored (e.g., in the database 115), the image processing machine 110 performs a cross-domain mapping to learn and record correlations between the extracted visual descriptors (e.g., clusters of visual descriptors) and their corresponding depth descriptors (e.g., clusters of depth descriptors). This cross-domain mapping may be stored as a data structure (e.g., matrix) in the database 115 for later use in the post-training phase 302. Such a data structure may hence function as a map that is usable to translate a visual descriptor (e.g., represented in the visual dictionary $W_r$) to a corresponding depth descriptor (e.g., represented in the depth dictionary $W_d$), or vice versa.

The post-training phase 302 includes blocks 360, 370, 380, and 390. At block 360, a query image (e.g., a RGB query image) is accessed by the image processing machine 110 (e.g., as a received submission in a query for depth estimation or in a request for depth estimation from the user 132 via the device 130). At block 370, visual descriptors (e.g., kernel/sparse descriptors calculated from color information) are extracted from the query image by the image processing machine 110. At block 380, the corresponding depth descriptor (e.g., a kernel/sparse descriptor of depth information) is obtained by the image processing machine 110 for each of the visual descriptors extracted from the query image, and this depth descriptor may be obtained based on the data structure (e.g., the cross-domain mapping). At block 390, the image processing machine creates a depth map for the query image (e.g., depth map that corresponds to the query image), and this depth map may be created based on the obtained depth descriptor. Accordingly, the corresponding depth map for the query image may be created (e.g., calculated, predicted, estimated, or any suitable combination thereof) by the image processing machine 110.

Regarding the extraction of visual descriptors and depth descriptors, the image processing machine 110 may be configured to transform various features of the reference images to a data dependent space, spanned by dictionary elements. Suppose there is an $i^{th}$ image to be represented using a set of global descriptors $\{r_i, d_i\}$. The image processing machine 110 may be configured to transform $\{r_i, d_i\}$ to a data dependent space denoted as $\{\alpha_i, \beta_i\}$. The data dependent transformation may be achieved by:

$$\alpha_i = g_r(W_r, r_i) \beta_i = g_d(W_d, d_i). \tag{1}$$

Thus, the global descriptors may be represented in terms of their respective dictionary elements. The functional forms of $g_r$ and $g_d$ determine the types of relationships encoded to dictionary elements.

Certain example embodiments of the image processing machine 110 implement one of two alternative approaches to encode relationships between a global image descriptor and other dictionary elements (e.g., all other dictionary elements). In the first approach, kernel descriptors are used, and the image processing machine 110 is configured to compute the distance of the given global descriptor to all other elements in the dictionary $W_r$. Assuming that $i^{th}$ the basis element is represented by column $W_r(:, i)$ of the dictionary, the image processing machine 110 computes the pairwise distances (e.g., kernel) of the input data point to all basis elements of the dictionary. This results in one descriptor each for the RGB and depth global features, which may be denoted as an RGB dictionary kernel and a depth dictionary kernel, respectively.

RGB Dictionary Kernel:

$$\alpha_i^k = [K(r_i, W_r(:,1)) \ldots K(r_i, W_r(:,p))] \tag{2}$$

Depth Dictionary Kernel:

$$\beta_i^k = [K(d_i, W_d(:,1)) \ldots K(d_i, W_d(:,p))] \tag{3}$$

In the second approach, sparse positive descriptors are used, and the image processing machine 110 is configured to perform a sparse decomposition to predict weights on basis elements using a sparse set of coefficients over the basis elements. This procedure may be accomplished using orthogonal matching pursuit.

RGB Dictionary Sparse Positive:

$$\min_{\alpha_i^s \in R^p} \|r_i - W_r \alpha_i^s\|_2 \text{ s.t. } \|\alpha_i^s\|_0 \leq L, \alpha_i^s \geq 0 \tag{4}$$

Depth Dictionary Sparse Positive:

$$\min_{\beta_i^s \in R^p} \|d_i - W_d \beta_i^s\|_2 \text{ s.t. } \|\beta_i^s\|_0 \leq L, \beta^s \geq 0 \tag{5}$$

According to various example embodiments, the image processing machine 110 may be configured to create a dictionary (e.g., the visual dictionary $W_r$ or of the depth dictionary $W_d$) using one or more of various techniques. One technique usable for dictionary creation is k-means clustering. The image processing machine 110 is configured to cluster descriptors (e.g., visual descriptors or depth descriptors) from the entire dataset into a set of representative p centroids. The images (e.g., color images or depth images) closest to these cluster centroids are then selected by the image processing machine 110 as basis elements of the dictionary. Since clustering selects diverse representatives of the dataset, the clusters formed are likely to represent different parts of the feature space where input data points exist.

Another technique for creating a dictionary (e.g., the visual dictionary $W_r$ or of the depth dictionary $W_d$) is to utilize the entire training dataset as a dictionary. This technique is consistent with sparse coding approaches used for face recognition. However, this technique results in a much larger dictionary and higher dimensionality of projected features, though such a situation may be handled by sparse matrix decomposition techniques.

As noted above, the image processing machine 110 performs cross-domain mapping between dictionaries at block 350 in FIG. 3. This may be performed by determining (e.g., calculating, estimating, predicting, or any suitable combination thereof) a mathematical transformation between visual descriptors (e.g., describing RGB features) and depth descriptors (e.g., describing depth features). According to various example embodiments, such a transformation may be modeled as a linear model given by:

$$\alpha = [\alpha_1 \alpha_2 \ldots \alpha_p]$$

$$\beta = [\beta_1 \beta_2 \ldots \beta_p]$$

$$\alpha T = \beta \rightarrow T = \alpha^{-1} \beta \tag{6}$$

The transformation matrix $T \in \Re^{p \times p}$ defines a mapping from the visual feature space (e.g., RGB feature space) to the depth feature space, assuming this linear model. In alternative example embodiments, a different mathematical mapping may be used to map the visual feature space to the depth feature space, including one or more non-linear mappings.

Even though the extracted visual descriptors (e.g., kernel/sparse descriptors extracted from the reference images) are global image descriptors that attempt to describe the entire image, the image processing machine 110 may be configured to create (e.g., calculate, estimate, or predict) pixel-level depth information during the post-training phase 302. This may be considered as performing depth estimation using top-down information alone. Pixel-level information pertaining to local shapes or textures in the reference images (e.g., RGB training images) is not used in the workflow 300, according to certain example embodiments. In such example embodiments, the depth maps that result may be coarse and may fit poorly with the true edges (e.g., borders or other boundaries) in the query image.

Accordingly, some example embodiments of the image processing machine 110 are configured to perform structural post-processing based on the query image. In order to refine the depth map created for the query image, the image processing machine 110 may be configured to perform superpixel partitioning of the query image (e.g., input image) $R_i$. The superpixel partitioning may be denoted by $S_i = \{s_{i1}, \ldots, s_i|s|\}$, where $|.|$ denotes set cardinality and $s_{ij}^k$ denotes the $k^{th}$ pixel in superpixel $s_{ij}$. Recalling that the created depth map may be denoted by $\hat{D}_i$, the created depth map may be refined by the image processing machine 110 under an assumption that the pixels constituting a superpixel are more likely to have similar depth values. According to various example embodiments, the refinement of the depth map is performed using, $$\hat{D}_i[s_{ij}^k] = \frac{\sum_k \hat{D}_i[s_{ij}^k]}{|\hat{D}_i[s_{ij}]|} \tag{7}$$

This procedure fits a piecewise constant value to the entire superpixel, resulting in a refined depth map that is more interpretable since it aligns well to true edges (e.g., borders) in the query image. Subsequently, one or more planes indicated or otherwise represented in the refined depth map may be deformed (e.g., by the image processing machine 110) to a ramp by utilizing a random sample consensus (RANSAC) algorithm to fit planes that can have arbitrary orientations with respect to the plane parallel to the camera, resulting in a smoother depth map.

Figure 4:
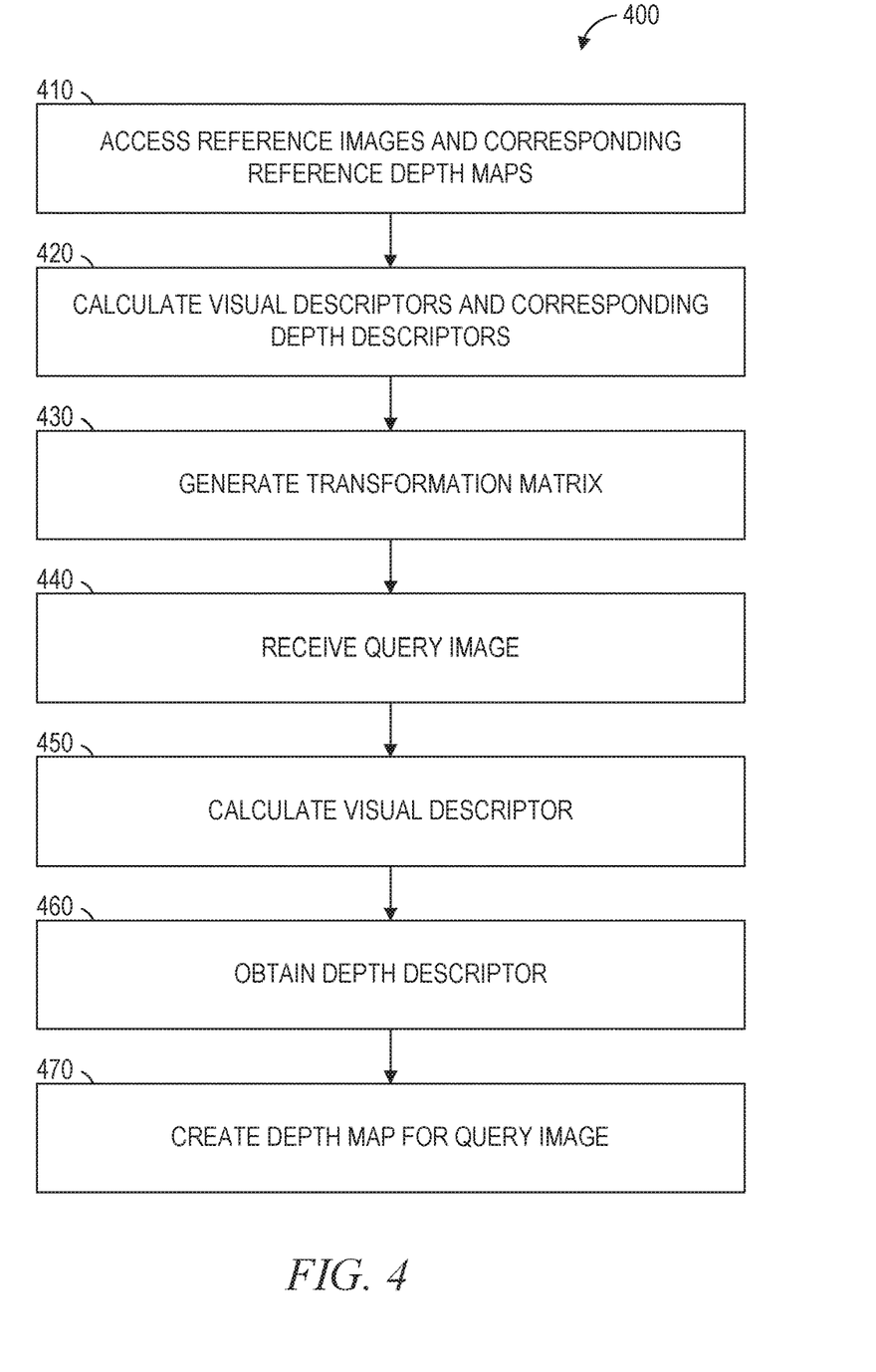
FIGS. 4-6 are flowcharts illustrating operations of the image processing machine in performing a method of estimating depth from a single image, according to some example embodiments.
Figure 5:
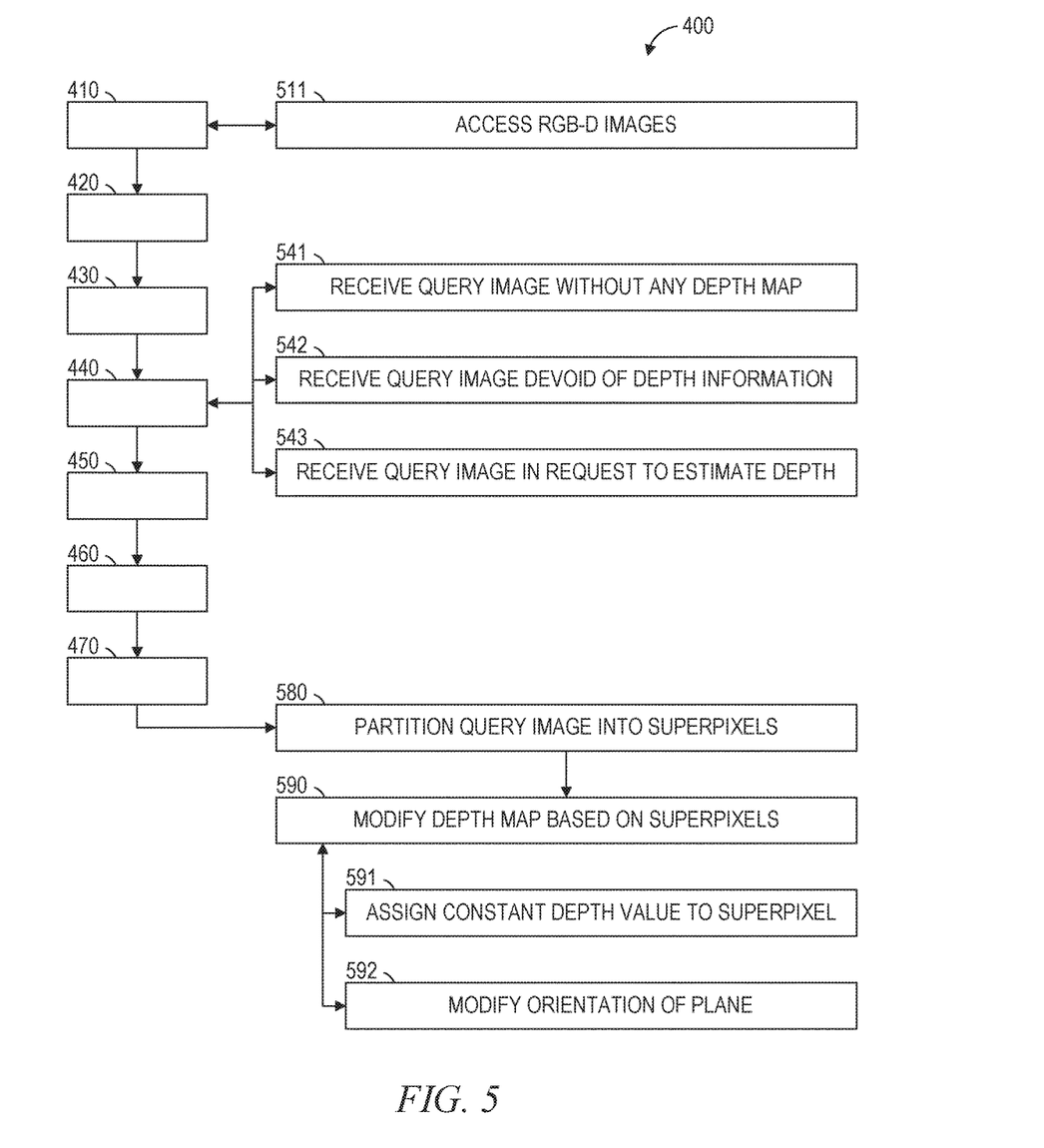
Figure 6:
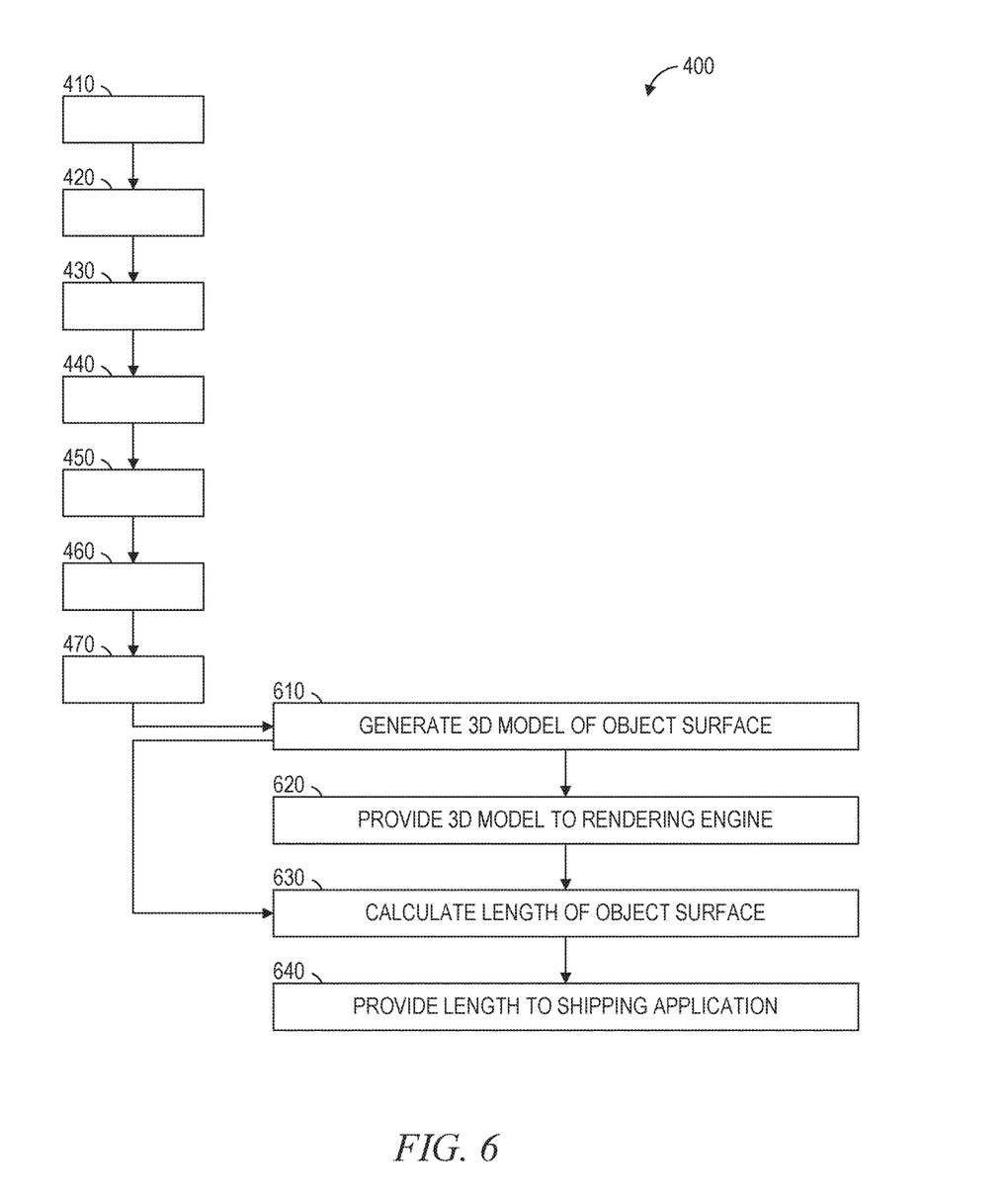

FIGS. 4-6 are flowcharts illustrating operations of the image processing machine 110 in performing a method 400 of estimating depth from a single image, according to some example embodiments. Operations in the method 400 may be performed using modules described above with respect to FIG. 2. As shown in FIG. 4, the method 400 includes operations 410, 420, 430, 440, 450, 460, and 470. Operations 410-430 may be performed during the training phase 301, while operations 440-470 may be performed during the post-training phase 302.

In operation 410, the access module 210 (e.g., within the database trainer module 270) accesses reference images and corresponding reference depth maps from the database 115 (e.g., a reference database). The reference images may be color images (e.g., RGB images), and each of the reference images may correspond to one of the reference depth maps (e.g., depth images). For example, a particular reference image (e.g., a first reference image) corresponds to a particular reference depth map (e.g., a first reference depth map). Moreover, the reference image includes color pixels, and the reference depth map includes a corresponding depth value (e.g., depth pixel) for each of the color pixels. As noted above, each color pixel may be defined by at least three color values (e.g., three tristirnulus values, such as a red value, the green value, and a blue value for an RGB pixel). In some example embodiments, the reference images and their corresponding reference depth maps are combined into reference images that combine both color and depth information (e.g., RGB-D images).

In operation 420, the descriptor module 220 (e.g., within the database trainer module 270) calculates visual descriptors and corresponding depth descriptors based on (e.g., from) the reference images and corresponding reference depth maps accessed in operation 410. In some example embodiments, the descriptor module 220 also performs clustering (e.g., k-means clustering) to build a visual dictionary and a depth dictionary. In alternative example embodiments, no clustering is performed.

In operation 430, the matrix module 230 (e.g., within the database trainer module 270) generates a data structure (e.g., a transformation matrix) that correlates the calculated visual descriptors (e.g., individual visual descriptors or clusters of visual descriptors) with their corresponding depth descriptors (e.g., an individual depth descriptor that corresponds to an individual visual descriptor or to a cluster of visual descriptors). As noted above, this data structure may constitute a cross-domain mapping between the visual dictionary and the depth dictionary. This may have the effect of mapping visual descriptors extracted from the reference images to depth descriptors of those same reference images. The matrix module 230 may store this data structure in the database 115 (e.g., for immediate or later use).

In operation 440, the query module 240 (e.g., within the depth map module 280) receives a query image. Specifically, the query image may be a single query image that is submitted to the image processing machine 110 from the device 130 by the user 132. The query image may be received as all or part of a query for depth information calculated, estimated, or otherwise derived from the query image. The query image may be received as all or part of a request to calculate, estimate, or otherwise derive depth information from the query image. In some example embodiments, the query image is received with a request or command to provide the depth information to a shipping application, a visualization application, or any suitable combination thereof.

In operation 450, the analysis module 250 (e.g., within the depth map module 280) analyzes the query image received in operation 440 and calculates one or more visual descriptors from the received query image. In various example embodiments, the analysis module 250 may utilize one or more of the same techniques for extracting visual descriptors as used by the descriptor module 220 in operation 420.

In operation 460, the creator module 260 (e.g., within the depth map module 280) accesses the data structure (e.g., the transformation matrix) generated in operation 430. In some example embodiments, the creator module 260 initially accesses the visual dictionary and the depth dictionary. The data structure, the visual dictionary, the depth dictionary, or any suitable combination thereof, may be stored in the database 115 and accessed from the database 115. Accordingly, the creator module 260 obtains one or more depth descriptors corresponding to the one or more visual descriptors calculated in operation 450. Specifically, the creator module 260 may obtain a corresponding depth descriptor for each of the calculated visual descriptors, based on the accessed data structure (e.g., the transformation matrix).

In operation 470, the creator module 260 creates a depth map for the query image that was received in operation 440. The creation of the depth map is based on the one or more depth descriptors obtained in operation 460. That is, the creator module 260 may generate (e.g., calculate, estimate, predict, or otherwise create) the depth map that corresponds to the query image, based on the depth descriptors obtained via accessing the data structure.

As shown in FIG. 5, the method 400 may include one or more of operations 511, 541, 542, 543, 580, 590, 591, and 592. In operation 511 may be performed as part (e.g., a precursor task, a subroutine, or a portion) of operation 410, in which the access module 210 accesses the reference images and their corresponding depth maps. In operation 511, the access module 210 accesses reference RGB-D images from the database 115. In such example embodiments, each reference RGB-D image includes an RGB image and its corresponding reference depth map.

One or more of operations 541, 542, and 543 may be performed as part of operation 440, in which the query module 240 receives the query image. In operation 541, the query module 240 receives the query image without any corresponding depth map (e.g., depth image). For example, the query image may be received as a plain RGB image with no accompanying depth map.

In operation 542, the query module 240 receives the query image, and the query image is devoid of any depth information (e.g., in its file metadata). For example, the query image may be a plain RGB image with no depth information stored in its non-pixel data (e.g., its header or other hidden data).

In operation 543, the query module 240 receives the query image within a submission (e.g., received from the device 130), and the submission may be all or part of a request to estimate depth information solely from the query image. In such example embodiments, the creating of the depth map in operation 470 may be performed in response to this request.

According some example embodiments, operations 580 and 590 may be performed after operation 470, in which the creator module 260 creates the depth map that corresponds to the query image. Operations 580 and 590 may form all or part of a set of post-processing activities to refine the created depth map (e.g., to align the depth map with edges depicted in the query image).

In operation 580, the creator module 260 partitions the query image into superpixels (e.g., as discussed above with respect to FIG. 3). In operation 590, the creator module 260 modifies the created depth map based on the superpixels partitions in operation 580 (e.g., as discussed above with respect to FIG. 3). According to various example embodiments, one or more of operations 591 and 592 may be performed as part of operation 590.

In operation 591, the creator module 260 modifies the created depth map by assigning a constant depth value to each pixel within one or more superpixels in the query image. As noted above, this may produce a refined depth map that is more interpretable since it aligns well to true edges (e.g., borders) in the query image.

In operation 592, the creator module 260 modifies the created depth map by modifying an orientation of a plane that is represented by a superpixel in the query image. This operation may be repeated for one or more additional planes indicated or otherwise represented in the depth map. As noted above, each plane may be deformed to a ramp by utilizing a RANSAC algorithm, resulting in a smoother depth map.

As shown in FIG. 6, the method 400 may include one or more of operations 610, 620, 630, and 640. Some or all of operations 610-640 may be performed after operation 470, in which the creator module 260 creates the depth map for the query image.

In operation 610, the visualization module 295 generates a 3D model of a surface of a physical object depicted in the query image. For example, the physical object may be an item to be shipped. As another example, the physical object may be part of the scene depicted in the query image (e.g., a wall, a floor, a ceiling, a piece of indoor furniture, an outdoor landscaping item, a person, the user 132, or any suitable combination thereof). Accordingly, the created depth map (e.g., as modified by performance of operation 590) may include a 3D representation of the surface of the physical object that is depicted in the query image. The generated 3D model thus may be or include a point cloud (e.g., a 3D array of points) that includes a set of points that represents the surface of the physical object. Moreover, the generation of the 3D model may be based on camera information (e.g., included in the query image), the created depth map (e.g., as modified by performance of operation 590) for the query image, or both.

In operation 620, the visualization module 295 provides the generated 3D model to a rendering engine (e.g., 3D rendering engine). The rendering engine may be part of the device 130, and may be provided to the device 130 via the network 190. Alternatively, the rendering engine may be an additional module within the image processing machine 110. Wherever located, the rendering engine may be configured to create a 31) visualization based on the provided 3D model, thus creating a 3D visualization of at least the surface of the physical object depicted in the query image. Such a 31) visualization may be provided to the device 130 and accordingly presented to the user 132.

In operation 630, the shipping module 290 calculates a length of the surface of the physical object based on the 3D model generated operation 610. As noted above, the generated 3D model may be or include a 3D cloud of points among which are points that represent the surface of the physical object depicted in the query image. The shipping module 290 may calculate one or more lengths of the represented surface by calculating (e.g., mathematically measuring) one or more distances between two or more of these points. Such calculations may be further based on camera information included in the query image.

In operation 640, the shipping module 290 provides the calculated length of the surface to a shipping application. For example, the physical object depicted in the query image may be a shippable item (e.g., an item to be shipped), and the shipping module 290 may provide one or more calculated dimensions (e.g., lengths) of one or more surfaces of the shippable item to the shipping application. According to some example embodiments, the shipping application is configured to select, recommend, or suggest a shipping container based on the provided dimensions.

According to various example embodiments, one or more of the methodologies described herein may facilitate estimation of depth information from a single image. Moreover, one or more of the methodologies described herein may facilitate the training of an image processing system to generate and refine (e.g., via superpixel post-processing) a transformation matrix usable to obtain depth descriptors from the depth dictionary, given visual descriptors represented in a visual dictionary. Furthermore, one or more the methodologies described herein may facilitate creation of a corresponding depth map in response to submission of a query image that lacks depth information. Hence, one or more of the methodologies described herein may facilitate improved user experiences with the query image (e.g., by providing alternative 3D views of object depicted in the query image), as well as improved accuracy in performing shipping activities (e.g., by providing dimensions of the shippable item depicted in the query image).

When these effects are considered in aggregate, one or more of the methodologies described herein may obviate a need for certain efforts or resources that otherwise would be involved in obtaining depth information from a single image that lacks it. Efforts expended by a user in estimating depth information from a single image may be reduced by one or more of the methodologies described herein. Computing resources used by one or more machines, databases, or devices (e.g., within the network environment 100) may similarly be reduced. Examples of such computing resources include processor cycles, network traffic, memory usage, data storage capacity, power consumption, and cooling capacity.

Figure 7:
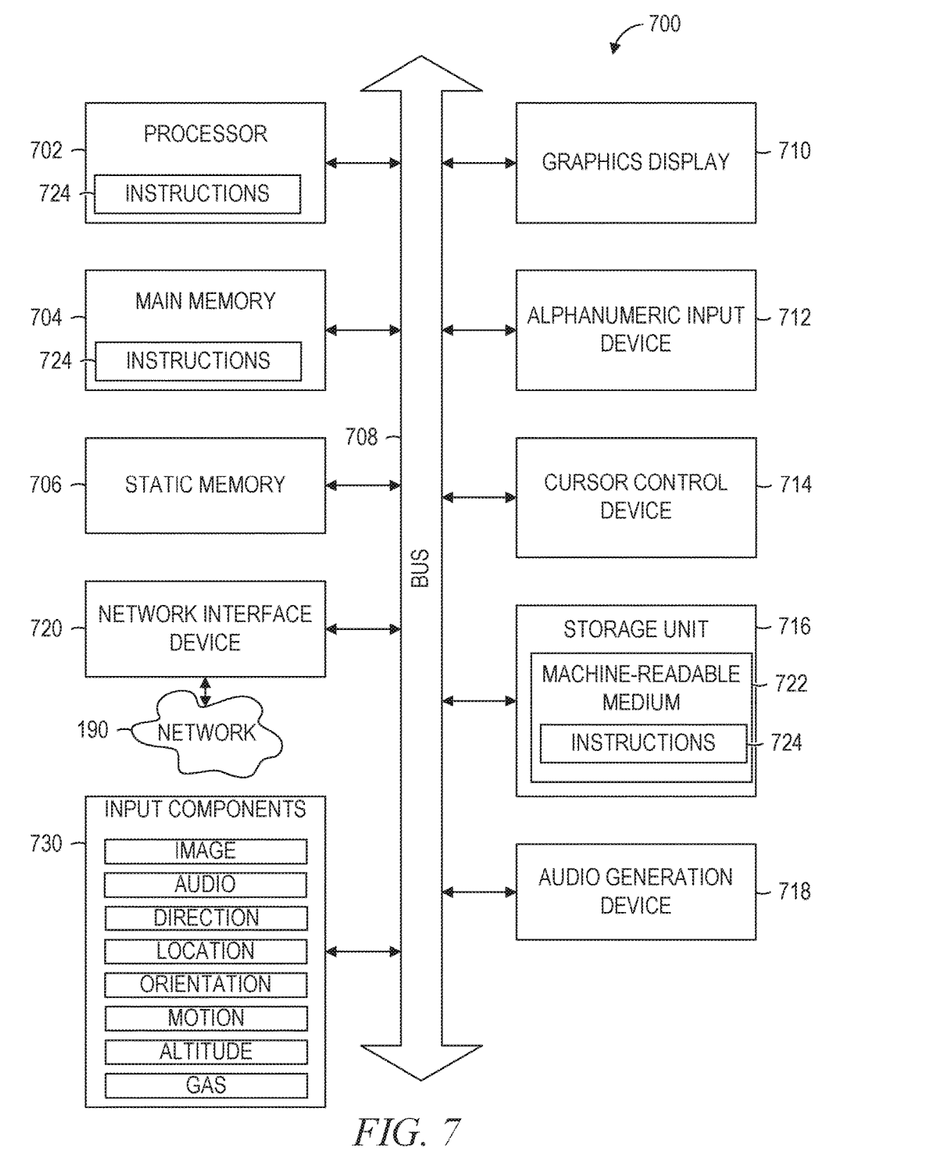
FIG. 7 is a block diagram illustrating components of a machine, according to some example embodiments, able to read instructions from a machine-readable medium and perform any one or more of the methodologies discussed herein.

FIG. 7 is a block diagram illustrating components of a machine 700, according to some example embodiments, able to read instructions 724 from a machine-readable medium 722 (e.g., a non-transitory machine-readable medium, a machine-readable storage medium, a computer-readable storage medium, or any suitable combination thereof) and perform any one or more of the methodologies discussed herein, in whole or in part. Specifically, FIG. 7 shows the machine 700 in the example form of a computer system (e.g., a computer) within which the instructions 724 (e.g., software, a program, an application, an applet, an app, or other executable code) for causing the machine 700 to perform any one or more of the methodologies discussed herein may be executed, in whole or in part.

In alternative embodiments, the machine 700 operates as a standalone device or may be communicatively coupled (e.g., networked) to other machines. In a networked deployment, the machine 700 may operate in the capacity of a server machine or a client machine in a server-client network environment, or as a peer machine in a distributed (e.g., peer-to-peer) network environment. The machine 700 may be a server computer, a client computer, a personal computer (PC), a tablet computer, a laptop computer, a netbook, a cellular telephone, a smartphone, a set-top box (STB), a personal digital assistant (PDA), a web appliance, a network router, a network switch, a network bridge, or any machine capable of executing the instructions 724, sequentially or otherwise, that specify actions to be taken by that machine. Further, while only a single machine is illustrated, the term "machine" shall also be taken to include any collection of machines that individually or jointly execute the instructions 724 to perform all or part of any one or more of the methodologies discussed herein.

The machine 700 includes a processor 702 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 704, and a static memory 706, which are configured to communicate with each other via a bus 708. The processor 702 may contain microcircuits that are configurable, temporarily or permanently, by some or all of the instructions 724 such that the processor 702 is configurable to perform any one or more of the methodologies described herein, in whole or in part. For example, a set of one or more microcircuits of the processor 702 may be configurable to execute one or more modules (e.g., software modules) described herein.

The machine 700 may further include a graphics display 710 (e.g., a plasma display panel (PUP), a light emitting diode (LED) display, a liquid crystal display (LCD), a projector, a cathode ray tube (CRT), or any other display capable of displaying graphics or video). The machine 700 may also include an alphanumeric input device 712 (e.g., a keyboard or keypad), a cursor control device 714 (e.g., a mouse, a touchpad, a trackball, a joystick, a motion sensor, an eye tracking device, or other pointing instrument), a storage unit 716, an audio generation device 718 (e.g., a sound card, an amplifier, a speaker, a headphone jack, or any suitable combination thereof), and a network interface device 720.

The storage unit 716 includes the machine-readable medium 722 (e.g., a tangible and non-transitory machine-readable storage medium) on which are stored the instructions 724 embodying any one or more of the methodologies or functions described herein. The instructions 724 may also reside, completely or at least partially, within the main memory 704, within the processor 702 (e.g., within the processor's cache memory), or both, before or during execution thereof by the machine 700. Accordingly, the main memory 704 and the processor 702, may be considered machine-readable media (e.g., tangible and non-transitory machine-readable media). The instructions 724 may be transmitted or received over the network 190 via the network interface device 720. For example, the network interface device 720 may communicate the instructions 724 using any one or more transfer protocols (e.g., hypertext transfer protocol (HTTP)).

In some example embodiments, the machine 700 may be a portable computing device, such as a smart phone or tablet computer, and have one or more additional input components 730 (e.g., sensors or gauges). Examples of such input components 730 include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 722 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing the instructions 724 for execution by the machine 700, such that the instructions 724, when executed by one or more processors of the machine 700 (e.g., processor 702), cause the machine 700 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible (e.g., non-transitory) data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute software modules (e.g., code stored or otherwise embodied on a machine-readable medium or in a transmission medium), hardware modules, or any suitable combination thereof. A "hardware module" is a tangible (e.g., non-transitory) unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, and such a tangible entity may be physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software (e.g., a software module) may accordingly configure one or more processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. As used herein, "processor-implemented module" refers to a hardware module in which the hardware includes one or more processors. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A method comprising:
   accessing, by one or more processors of a machine, a query image;
   calculating, by one or more processors of the machine, a query visual descriptor from the query image;
   obtaining, by one or more processors of the machine, a reference depth descriptor that corresponds to the query visual descriptor from a database that correlates reference visual descriptors of reference images with corresponding reference depth descriptors of the reference images, each of the reference images corresponding to a different reference depth map;

generating, by one or more processors of the machine, a query depth map that corresponds to the query image based on the obtained reference depth descriptor;

subdividing, by one or more processors of the machine, the query image into superpixels; and modifying, by one or more processors of the machine, the created depth map by modifying an orientation of a plane represented by a superpixel among the superpixels.

2. The method of claim 1, wherein:
the modifying of the orientation of the plane represented by the superpixel is based on a summation of depth values of color pixels in the superpixel.

3. The method of claim 1, wherein:
the modifying of the orientation of the plane represented by the superpixel is based on a cardinality of depth values of color pixels in the superpixel.

4. The method of claim 1, wherein:
the modifying of the orientation of the plane represented by the superpixel is based on a ratio of a summation of depth values of color pixels in the superpixel to a cardinality of the depth values of the color pixels in the superpixel.

5. The method of claim 1, wherein:
the modifying of the orientation of the plane represented by the superpixel includes assigning a constant depth value to each pixel within the superpixel.

6. The method of claim 1, further comprising:
deforming the plane represented by the superpixel based on a random sample consensus algorithm.

7. The method of claim 1, wherein:
the receiving of the query image receives the query image without any corresponding depth map.

8. The method of claim 1, wherein:
the reference images and the query image are red-green-blue images devoid of depth values.

9. The method of claim 1, wherein:
the accessing of the query image includes receiving the query image within a request to estimate depth information from the query image; and
the generating of the query depth map is in response to the request to estimate the depth information.

10. The method of claim 1, further comprising:
prior to the obtaining of the reference depth descriptor, causing the database to correlate the reference visual descriptors of the reference images with their corresponding reference depth descriptors of the reference images.

11. The method of claim 10, further comprising:
accessing the reference images and corresponding reference depth maps;
generating the reference visual descriptors and their corresponding reference depth descriptors based on the accessed reference images and corresponding reference depth maps; and
generating a matrix that correlates the generated reference visual descriptors with their generated corresponding depth descriptors to cause the database to correlate the reference visual descriptors with their corresponding reference depth descriptors.

12. The method of claim 10, wherein:
each of the reference depth maps corresponds to a different reference image among the reference images and includes a depth pixel that corresponds to a color pixel in the corresponding reference image.

13. The method of claim 1, wherein:
the query image depicts a surface of a physical item and includes a header that specifies a camera parameter; and
the generated query depth map includes a three-dimensional representation of the surface of the physical item whose surface is depicted in the query image.

14. The method of claim 13, further comprising:
providing the three-dimensional representation of the surface of the physical item to a rendering engine configured to create a three-dimensional visualization of the surface of the physical item.

15. The method of claim 13, wherein:
the three-dimensional representation of the surface of the physical item includes a three-dimensional point cloud; and
the method further comprises:
calculating a length of the surface of the physical item based on the three-dimensional point cloud.

16. The method of claim 15, further comprising:
providing the calculated length of the surface of the physical item to a shipping application.

17. A non-transitory machine-readable storage medium comprising instructions that, when executed by one or more processors of a machine, cause the machine to perform operations comprising:
accessing a query image;
calculating a query visual descriptor from the query image;
obtaining a reference depth descriptor that corresponds to the query visual descriptor from a database that correlates reference visual descriptors of reference images with corresponding reference depth descriptors of the reference images, each of the reference images corresponding to a different reference depth map;
generating a query depth map that corresponds to the query image based on the obtained reference depth descriptor;
subdividing the query image into superpixels; and
modifying the created depth map by modifying an orientation of a plane represented by a superpixel among the superpixels.

18. The non-transitory machine-readable storage medium of claim 17, wherein:
the modifying of the orientation of the plane represented by the superpixel is based on a cardinality of depth values of color pixels in the superpixel.

19. A system comprising:
one or more processors; and
a memory storing instructions that, when executed by at least one processor among the one or more processors, cause the system to perform operations comprising:
accessing a query image;
calculating a query visual descriptor from the query image;
obtaining a reference depth descriptor that corresponds to the query visual descriptor from a database that correlates reference visual descriptors of reference images with corresponding reference depth descriptors of the reference images, each of the reference images corresponding to a different reference depth map;

generating a query depth map that corresponds to the query image based on the obtained reference depth descriptor;

subdividing the query image into superpixels; and modifying the created depth map by modifying an orientation of a plane represented by a superpixel among the superpixels.

20. The system of claim 19, wherein the operations further comprise:

prior to the obtaining of the reference depth descriptor, causing the database to correlate the reference visual descriptors of the reference images with their corresponding reference depth descriptors of the reference images.

* * * * *